United States Patent [19]

Schenck et al.

[11] Patent Number: 4,463,437
[45] Date of Patent: Jul. 31, 1984

[54] FURNACE BURDEN THERMOGRAPHIC METHOD AND APPARATUS

[75] Inventors: Arthur J. Schenck, Glenmoore; John P. Hoffman, Coopersburg; Glenn R. Crossley, Emmaus, all of Pa.

[73] Assignee: Bethlehem Steel Corp., Bethlehem, Pa.

[21] Appl. No.: 539,209

[22] Filed: Oct. 5, 1983

Related U.S. Application Data

[63] Continuation-in-part of Ser. No. 257,845, Apr. 27, 1981, abandoned.

[51] Int. Cl.$^3$ ............................ G01J 5/18; H04N 7/18
[52] U.S. Cl. .................................... 364/557; 358/107; 358/113; 364/477
[58] Field of Search ............... 364/468, 469, 472, 477, 364/577; 358/100, 101, 106, 109, 113

[56] References Cited

U.S. PATENT DOCUMENTS

| | | | |
|---|---|---|---|
| 3,099,744 | 7/1963 | Spooner | 250/308 |
| 3,544,710 | 12/1970 | Poos | 358/100 |
| 3,588,067 | 6/1971 | Shimotsuma et al. | 266/80 |
| 4,110,617 | 8/1978 | Legille | 250/342 |
| 4,217,608 | 8/1980 | MacGregor et al. | 358/113 |
| 4,319,270 | 3/1982 | Kimura et al. | 358/100 |
| 4,365,307 | 12/1982 | Tatsuwaki et al. | 364/557 |
| 4,403,251 | 9/1983 | Domarenok et al. | 364/557 |

OTHER PUBLICATIONS

Y. Togino et al., "Application of Thermoviewer at Blast Furnace Top", ASME Proceedings of the 38th Iron Making Conference, 38, Mar. 1979, pp. 295–304.

T. Tonteling, "Computer Analysis of Infrared Blast Furnace Burden Data", pp. 327–335.

Primary Examiner—Felix D. Gruber
Attorney, Agent, or Firm—John I. Iverson; John J. Selko

[57] ABSTRACT

Improved infrared camera system better enables furnace burden surface temperature measurements and temperature profile measurements and displays of such measurements to be made at various stocklines. An infrared data processing system is incorporated with the camera system which provides automatic acquisition, validation and preprocessing of thermal images from an infrared camera, defines and extracts key features of the thermal images, provides automatic classification and storage of thermal images, periodically reports on displays and printer burden temperature information, and provides convenient data retrieval and data archiving capability. The invention may be incorporated in new or existing methods and apparatus.

16 Claims, 10 Drawing Figures

TEMPERATURE PROFILE CHARACTERISTICS

| AREA WEIGHTED AVERAGE: | 367.01 F |
|---|---|
| CENTRAL ZONE MAX TEMP: | 626 F |
| FURNACE WEST WALL TEMP: | 212 F |
| FURNACE NORTH WALL TEMP: | 366 F |

| DISTANCE WEST WALL MAX TO WALL: | 7.92 FT |
|---|---|
| DISTANCE NORTH WALL MAX TO WALL: | 1.32 FT |

|  | WEST WALL | INTERMEDIATE | CENTRAL | INTERMEDIATE | NORTH WALL |
|---|---|---|---|---|---|
| NORMALIZED HEIGHT | -0.42 | 0.00 | 0.71 | 0.00 | 0.00 |
| NORMALIZED WIDTH (FT) | 7.92 | 0.00 | 4.00 | 0.00 | 1.32 |
| HEIGHT/WIDTH RATIO | -5.33 | 0.00 | 17.64 | 0.00 | 0.36 |
| HEIGHT, WIDTH PRODUCT | -1.67 | 0.00 | 2.82 | 0.00 | 0.00 |

| CENTRAL HEIGHT - WEST WALL HEIGHT | 1.13 |
|---|---|
| CENTRAL HEIGHT - NORTH WALL HEIGHT | 0.00 |
| CENTRAL TEMP/WEST WALL TEMP RATIO | 2.95 |
| CENTRAL TEMP/NORTH WALL TEMP RATIO | 1.71 |
| CENTRAL RATIO/WEST WALL TEMP | 0.00 |
| CENTRAL RATIO/NORTH WALL TEMP | 0.00 |

Fig. 6

TEMPERATURE PROFILE CHARACTERISTICS

| | | |
|---|---|---|
| AREA WEIGHTED AVERAGE: | 303.17 F | |
| CENTRAL ZONE MAX TEMP.: | 453 F | |
| FURNACE WEST WALL TEMP: | 212 F | |
| FURNACE NORTH WALL TEMP: | 296 F | |
| DISTANCE WEST WALL MAX TO WALL: | 6.60 FT | |
| DISTANCE NORTH WALL MAX TO WALL: | 1.32 FT | |

| | WEST WALL | INTERMEDIATE | CENTRAL | INTERMEDIATE | NORTH WALL |
|---|---|---|---|---|---|
| NORMALIZED HEIGHT | -0.30 | 0.00 | 0.49 | 0.00 | -0.02 |
| NORMALIZED WIDTH (FT) | 6.60 | 0.00 | 7.00 | 0.00 | 1.32 |
| HEIGHT/WIDTH RATIO | -4.56 | 0.00 | 7.07 | 0.00 | -1.36 |
| HEIGHT, WIDTH PRODUCT | -0.99 | 0.00 | 3.46 | 0.00 | -0.01 |

| | |
|---|---|
| CENTRAL HEIGHT-WEST WALL HEIGHT | 0.80 |
| CENTRAL HEIGHT-NORTH WALL HEIGHT | 0.00 |
| CENTRAL TEMP/WEST WALL TEMP RATIO | 2.14 |
| CENTRAL TEMP/NORTH WALL TEMP RATIO | 1.53 |
| CENTRAL RATIO/WEST WALL TEMP | 0.00 |
| CENTRAL RATIO/NORTH WALL TEMP | 0.00 |

Fig. 8

EQUATIONS FOR COORDINATE TRANSFORMATION

2) $A = \dfrac{S + Y_2}{H} = \text{Tan}(\theta + \Gamma)$

3) $\text{Tan}\,\Gamma = \dfrac{(A - \text{Tan}\,\theta)}{(1 + A\,\text{Tan}\,\theta)}$ 4) $Y_3 = F\,\text{Tan}\,\Gamma$ 5) $\ell = \sqrt{F^2 + Y_3^2}$ 6) $L = \sqrt{H^2 + (S + Y_2)^2}$ 7) $X_3 = X_2 \dfrac{(\ell)}{(L)}$

LEGEND $X_0$ - X COORDINATE ON BURDEN SURFACE
$Y_0$ - Y COORDINATE ON BURDEN SURFACE
$X_2$ - X COORDINATE ON BURDEN SURFACE AFTER TRANSLATION
$Y_2$ - Y COORDINATE ON BURDEN SURFACE AFTER TRANSLATION
$X_3$ - X COORDINATE ON CAMERA LENS
$Y_3$ - Y COORDINATE ON CAMERA LENS

- S - HORIZONTAL DISTANCE - CAMERA LENS TO PROJECTION OR CENTER OF LENS ON BURDEN SURFACE
- H - VERTICAL DISTANCE FROM CAMERA LENS TO POINT OF INTEREST ON STOCKLINE
- $\Gamma$ - ANGLE BETWEEN LENS CENTERLINE & LINE FROM FOCAL POINT TO POINT ON BURDEN SURFACE
- $\theta$ - VERTICAL CAMERA VIEW ANGLE
- L - DISTANCE FROM FOCAL POINT OF CAMERA LENS TO POINT ON BURDEN
- $\ell$ - DISTANCE FROM POINT OF INTEREST ON CAMERA LENS TO FOCAL POINT OF LENS
- A - TANGENT OF ANGLE GAMMA + THETA
- f - FOCAL LENGTH OF CAMERA
- R - HORIZONTAL DISTANCE FROM CAMERA LENS TO FURNACE AXIS (¢)

FURNACE BURDEN THERMOGRAPHIC METHOD AND APPARATUS

REFERENCE TO RELATED APPLICATION

This application is a continuation in part of Ser. No. 257,845 filed Apr. 27, 1981 and now abandoned.

BACKGROUND OF THE INVENTION

This invention relates to a method and apparatus for determining a thermograph of furnace burden surface and surface temperature profile at various stocklines having thermal image data processing.

DESCRIPTION OF THE PRIOR ART

During operation of blast furnaces and shaft furnaces, burden material is periodically discharged from storage and supply means atop the furnace to the furnace interior where many chemical and physical reactions are taking place. For example, many large capacity blast furnaces have an interior charging chute for directing known quantities of burden material anywhere on the burden surface.

Furnace charging practices must be developed for each furnace installation, whether large or small, which produces the correct burden charging and replenishing patterns at various stocklines. This practice must result in an optimum layer configuration and furnace performance, even when like burden material categories may be supplied from different sources that would otherwise vary metallurgical results.

Furnace operators require accurate and reliable knowledge of the reactions taking place inside the furnace to facilitate their task of controlling furnace operation, its yield and safety during production. A measure of this knowledge is burden surface temperature and distribution in surface temperature profile at any point of the charge and at every stockline. Burden surface temperature patterns at various stocklines are related to the furnace charging practice, variations thereof and the flow and circulation of hot gases effecting the internal reactions at the various stocklines.

Heretofore, burden surface temperatures were measured by an external infrared camera system with one or two cameras mounted oblique the furnace central axis. One typical well-known commercially available infrared camera system that is successful to a limited extent is an AGA Corp. "thermovision" system. This system comprises one infrared camera, camera electronics and a color CRT display which monitors burden surface temperature and displays different color patterns of relative, rather than actual, burden surface temperature ranges in real time.

Generally, commercially available infrared camera systems suffer from a number of drawbacks from the point of view of an operator of a large capacity blast furnace. For example, during the discharge of burden materials into the furnace, and for some time thereafter, infrared burden surface temperature patterns are quite unstable. Also, during this period, the furnace interior contains dust and gases that adversely affect the accuracy of infrared temperature measurements. No provisions are made in the prior art to supply a means of acquiring accurate and reliable temperature measurements of the entire furnace burden surface, at various stocklines, displayed in real time and corrected for thermal errors as well as optical errors caused by camera obliqueness. Moreover, burden temperature data had to be collected and analyzed manually, which for large blast furnace operation is an enormous task. Likewise, no provisions were made to supply a means of categorizing and logging furnace burden surface temperature measurements. With these shortcomings, the full potential of the infrared camera system as means for providing accurate and reliable knowledge for large-scale furnace operation could not be realized by the prior art.

SUMMARY OF THE INVENTION

A main object of this invention is to overcome the foregoing difficulties of prior art methods and apparatus.

Another object of this invention is to provide an improved method and apparatus for determining a furnace burden thermograph of its interior burden surface and/or surface temperature profile at various stocklines.

Still another object of this invention is to provide a furnace burden thermographic method and apparatus that performs more quickly and accurately than heretofore.

Yet another object of this invention is to provide a furnace burden thermographic method and apparatus that allows more effective correlation of burden temperature distributions with furnace performance and other operating parameters which will enable improved furnace operating strategy.

The foregoing objects may be obtained by incorporating an infrared data processing system, in either new or existing infrared camera systems, which provides automatic acquisition, validation and preprocessing of thermal images from an infrared camera and of burden material and category identification sources, defines and extracts key features of the thermal images including camera signal linearization and geometric distortion correction, provides automatic classification and storage of thermal images, periodically reports on displays and prints out burden temperature information, and provides convenient data retrieval and data archiving capability of up to two months of continuous operations. Data validation of thermal images comprises monitoring process parameters including a furnace wall reference thermocouple, furnace wind rate, burden material discharge status, charging chute position, burden stockline, and/or furnace top water spray. Thus, the present invention provides an improved furnace burden thermograph, more quickly, accurately and reliably than heretofore, while also providing more effective correlation of burden surface temperature distributions and surface temperature profiles with furnace performance and other operating parameters, thereby enabling better furnace operating strategies than heretofore.

DESCRIPTION OF THE PREFERRED EMBODIMENT

Figure 1:
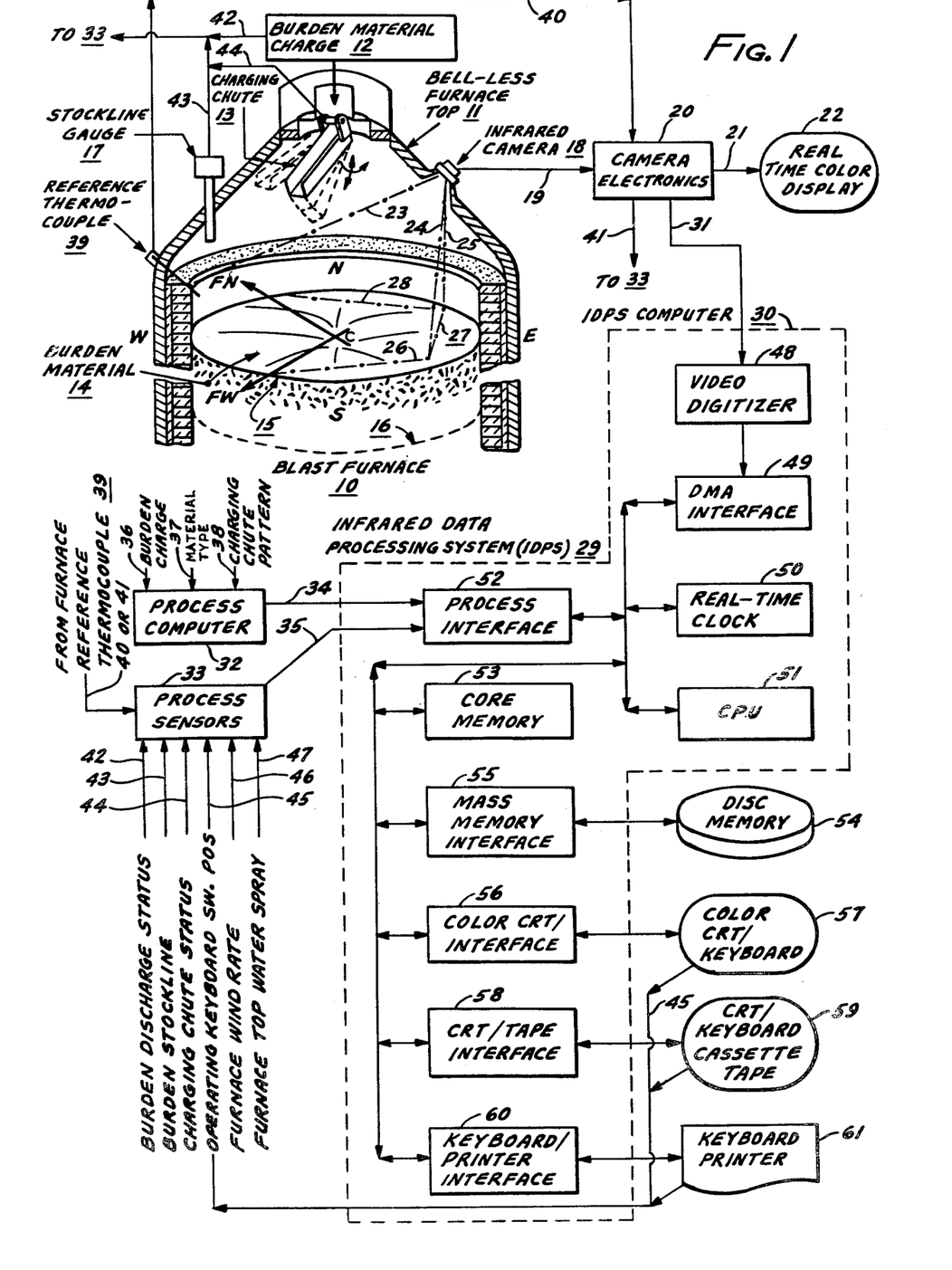
FIG. 1 is a schematic diagram of the present invention showing in isometric view a partial top cross-section of a bell-less blast furnace and in block form infrared camera system and infrared data processing system added to said camera system.

Referring to the drawings, particularly FIGS. 1-4, there is disclosed a method and apparatus for determining a furnace burden surface thermograph of top surfaces as well as a surface temperature profile of the furnace burden at various stocklines. FIG. 1 shows isometrically a partial top cross-section of blast furnace 10 having a large production capacity, a bell-less type furnace top 11, a compartmented source of burden material charge 12 and a rotating charging chute 13. A normal furnace charging cycle consists of four (4) or more consecutive and unique material discharges of coke, sintered iron ore, etc. in a predetermined order from source 12. Burden material charge 12 is distributed into layers of furnace burden material 14 by rotating and elevating charging chute 13 using almost any imaginable distribution pattern. Actual charging and distribution patterns are determined by a process computer as will be described below.

Burden material 14 when charged rises to upper burden surface level 15, but when subjected to hot gases may fall to burden surface level 16, or anywhere in between. Burden stockline is measured near the furnace wall by stockline gauge 17, preferably a non-contacting microwave device or the like, rather than a mechanical contacting profilemeter or equal.

As mentioned above, it is extremely important to the operator of blast furnace 10 to have available at all times an accurate and reliable presentation of the chemical and physical reactions taking place inside furnace 10. This includes a thermal image of burden surface temperatures at and between burden levels 15,16, as well as a thermal profile taken in a plane at or between burden levels 15,16 in a cross-section or segment identified as FW-C-FN in FIGS. 1 and 3-8 of the present invention. Operators have tried a commercially available remote video camera system coupled with a process control computer to satisfy their needs, but the results have not been entirely satisfactory.

One of the best commercially available remote video systems for use with furnace burden 14 is exemplified herein as an AGA-IRBIS "Thermovision" system manufactured by AGA Corporation, Lidingo, Sweden. The AGA "Thermovision" system, which is shown in the upper part of FIG. 1 block diagram, comprises an infrared camera 18, raw camera signal lead 19, camera electronics 20, output lead 21 and real-time false color display 22. Infrared video camera 18 scans burden material 14 and detects infrared radiation emitted by burden material 14 and produces a raw analog video camera signal voltage during scanning on lead 19 which varies nonlinearly with burden material 14 temperature. Camera electronics 20 filters and converts the raw nonlinear signal into a linear signal consisting of a plurality voltage levels which drive real-time false color display 22. This produces a dynamic image consisting of bands of false color hue patterns representing burden surface temperature ranges and thermal patterns. The thermal image patterns of burden surface temperatures conveyed by the AGA "Thermovision" system to an observer are without any specific numerical scale referenced to the color hues. In addition, the color hues are flexible voltage levels designed to accommodate a predetermined number of ranges, but are false representations of infrared temperatures of burden surface temperatures. Further, the AGA "Thermovision" system procured does not automatically produce a thermal profile of the absolute burden surface temperature, nor does it interpret profile data. Moreover, there are no provisions for calibrating such a system when an infrared detecting element has to be changed for maintenance or repair purposes or under any other condition.

Because burden charge 12 and rotating charging chute 13 are positioned on the central axis of blast furnace 10, infrared video camera 18 must be located outside of furnace 10 and aimed obliquely at the burden surface. This results in infrared camera 18 optical image field being different at each stockline between upper and lower burden surfaces 15,16, respectively. Therefore, infrared video camera 18 image field will receive geometrically distorted thermal image patterns of burden surface temperatures and have an error starting with the raw infrared video camera output signal. The actual camera image field of view illustrated in the isometric view of FIG. 1 is defined as an elevational field of view between upper edge 23 extending beyond the furnace top wall brick and lower edges 24,25, the latter edges developing into a plan view on the upper burden surface 15, for example, occuring within edges 26,27,28 and the distal furnace wall. The geometric distortion of infrared video camera 18 is carried through to display 22 because there are no provisions to correct this error in the AGA "Thermovision" system procured.

The foregoing and above-mentioned drawbacks of the AGA "Thermovision" system, and other commercial systems as well, may be overcome through modification by adding thereto the computerized infrared (thermal image) data processing system 29 shown in the remaining portion of the FIG. 1 block diagram. The modification may be made to either new or existing installations and includes a fuller range of operating features desired by furnace operators than is available commercially.

More particularly, computerized infrared data processing system 29 is arranged to provide automatic acquisition and preprocessing of raw thermal image signals from infrared video camera 18; validate thermal image signals through monitoring a furnace wall reference thermocouple and several other process parameters and of burden material and category sources; define and extract key features of the thermal images; linearize data and correct for camera geometric distortion and calibration errors; automatically classify and store thermal images; periodically report on color displays and printers burden temperature information; provide convenient data retrieval and data archiving capability of up to two months of continuous operation; and means are provided for utilizing the processed thermal image signal to cause the production of an intelligible form of the burden surface temperature.

In carrying out the provisions of computerized infrared data processing system 29, an IDPS computer 30 with fast input/output, real-time clock and arithmetic capability processes the variable raw analog video signal along with camera scan and timing signals, all fed over path 31, in conjunction with a plurality of monitored furnace process parameter signals generated either in furnace process control computer 32 or process sensors 33 and fed over respective paths 34,35 to computer 30. Certain of the monitored furnace process parameter signals are generally available in process computer 32 because they are fed thereto for other purposes. For convenience of illustration, these parameter signals are burden charge 36, material type 37 and charging chute pattern 38 signals which are fed over signal path 34.

The remaining monitored furnace process parameter signals fed from process sensors 33 over signal path 35 are generated as follows. A furnace wall reference thermocouple 39, having a sensing head positioned inside furnace 10 and always in view of infrared video camera 18, generates a furnace wall reference temperature signal fed over lead 40 to camera electronics 20, then over lead 41 to process sensor box 33. Camera electronics 20 may be modified to provide a true temperature reference for use on real-time color display 22 since, as noted above, this display ordinarily shows a false, keyless, thermal image of furnace burden surface 15 at various stocklines. If this modification is not desired, the furnace wall reference temperature signal may be fed directly to process sensor box 33 for validating and correction purposes as described below.

Additional monitored furnace process parameter signals fed to process sensor box 33 include a burden discharge status signal 42 from burden material charge source 12, a variable stockline signal 43 from stockline gauge 17, a charging chute status signal 44 from charging chute 13, an operating keyboard switch position signal 45 from CRT-printer keyboards described below and a furnace wind rate signal 46 and furnace top water spray signal 47 from well known sources which are not shown on the drawings.

Figure 2:
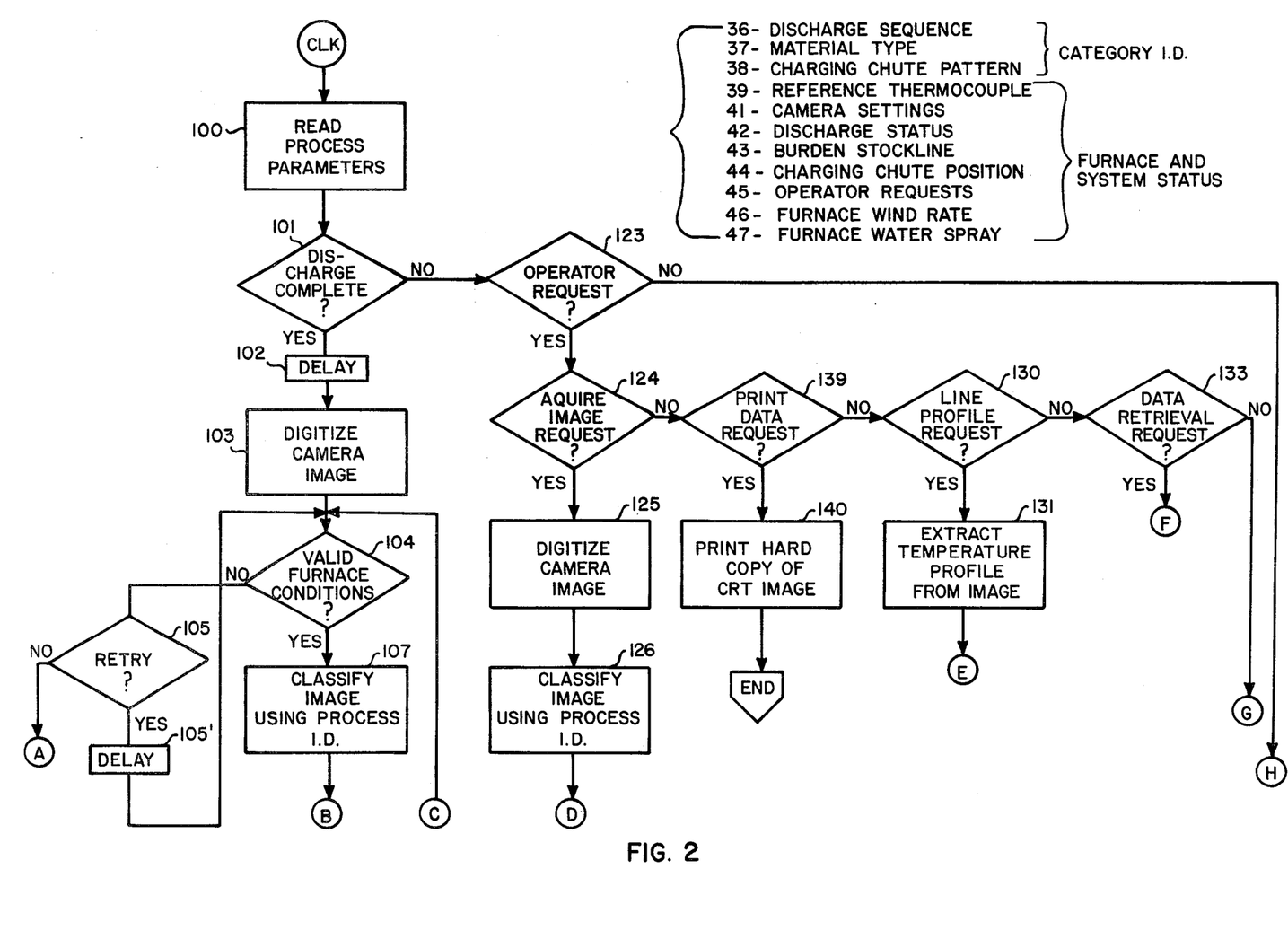
FIG. 2 and FIG. 2-A are functional flow charts of the features carried out by the infrared data processing system shown in FIG. 1.

IDPS computer 30 hardware includes video digitizer 48 which receives the variable raw analog infrared video signal representing a thermal image of burden surface 15 and the camera timing signal, both signals being fed over signal path 31. Video digitizer 48 continuously converts the raw analog infrared video signal or thermal image to a digital signal in the form of binary-coded point-to-point or pixel array. Digitized thermal image signals are fed to direct memory access (DMA) interface 49 which, in conjunction with real-time clock 50, central processing unit (CPU) 51 and process interface 52 with inputs of the monitored furnace process parameter signals, perform the necessary processing of IDPS computer 30 using logic implemented in the software shown in FIG. 2 and FIG. 2-A flow chart.

Software to automatically perform the processing operations of IDPS computer 30 is stored partly in core memory 53 and the remainder in disc memory 54, the latter being connected through mass memory interface 55. Software execution occurs in CPU 51 at, for example, one-tenth second intervals and is based on the status of real-time clock 50, process interface 52 and color CRT/interface 56. Monitored furnace process parameter signals input over leads 34,35 are used in IDPS computer 30 to provide the automatic data processing features noted above.

Figure 3:
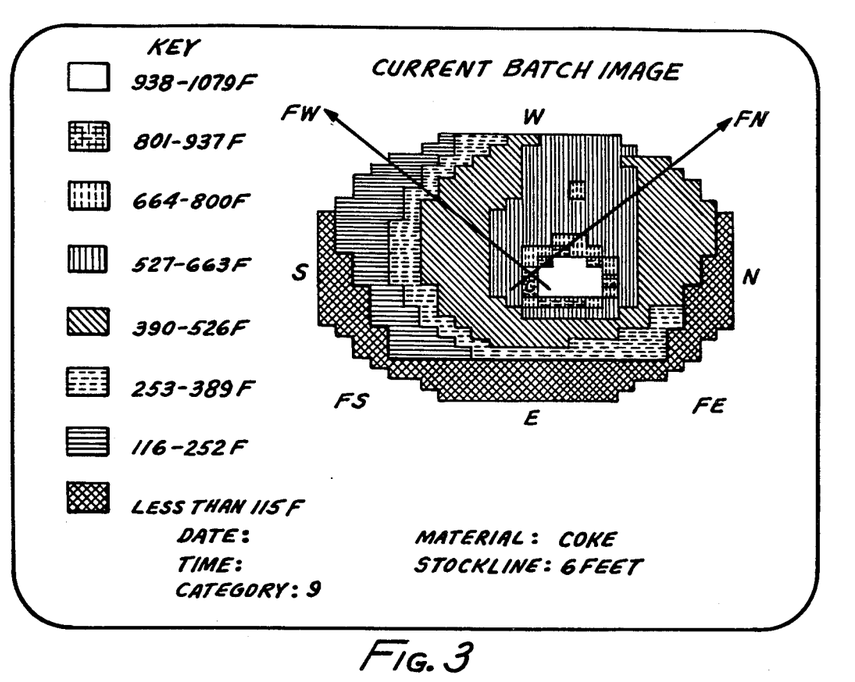
FIG. 3 is a diagrammatic plan view of a color CRT terminal showing various real time corrected thermal image temperature ranges and distribution of surface temperatures of a first burden and a first category of material.
Figure 4:
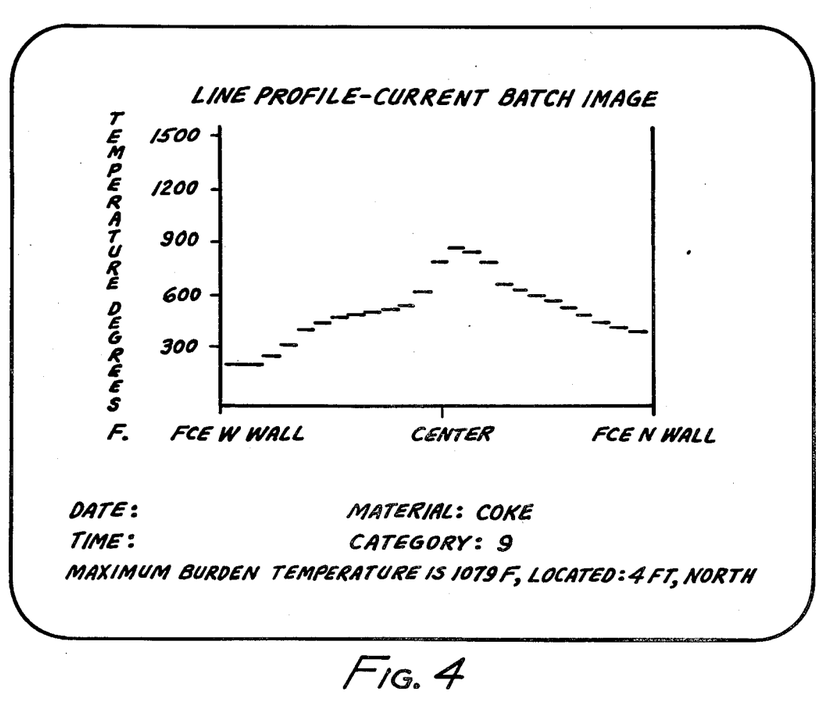
FIG. 4 is a typical graphical showing on a CRT terminal of a line temperature profile of current corrected batch image of the first burden material and first category taken along a vertical angular cross-sectional plane FW-C-FN of the furnace plan view in FIG. 3.

Also included in infrared data processing system 29, in addition to disc memory 54, are other means such as computer terminals for utilizing the processed thermal image signal to cause the production of an intelligible form of the furnace burden surface temperature such as is shown in FIGS. 3-8. In one instance, processed thermal image signals of a current batch is output through interface 56 and displayed on color CRT/keyboard 57 as shown in FIGS. 3 and 4. Manual data retrieval requests may be made of IDPS computer 30 and are entered by furnace operator interaction on the keyboard of device 57 and input through interface 56. In a second instance, IDPS computer 30 software is developed by a programmer interacting in a remote location using CRT/keyboard cassette tape display 59 and input through interface 58. Any of the computer-processed thermal image data is available for output through interface 58 and is displayed on device 59 as well as stored on cassette tapes using the cassette drives in device 59. In a third instance, hard copy reports of furnace burden thermal images and/or furnace operating parameters associated with the thermal images, such as are shown in FIGS. 5-8, are output from IDPS computer 30 through keyboard/printer interface 60 to keyboard printer 61. Software is arranged to automatically print hard copy at predetermined intervals, for example every hour, or manually on demand by operator interaction on the keyboard of device 61 and input through interface 60.

Each keyboard type 57,59,61 used can simulate one or more of the monitored furnace process parameter signals over path 45 to process sensors 33. This signal is one that is input to IDPS computer 30 via path 35 to process interface 52 and functions to override validation of a digital thermal image signal whenever a keyboard is in use.

A description follows of the software and algorithms used with the computerized infrared data processing system 20. Logic to perform a sequence of automatic and manual steps to acquire infrared camera 18 data and monitored furnace process parameter data, and to process, analyze, store and display thermal image data is implemented using software written in FORTRAN language and is illustrated in the block diagram of FIGS. 2 and 2-A.

As will become apparent hereinafter, such software and logic provide three main data processing paths:

(1) automatic acquisition and processing of thermal images;

(2) automatic averaging of data and consolidation of data into key features with archiving (storage) into files which are automatically further averaged at periodic intervals; and (3) response to operator requests for data retrieval both from the camera and from the data archives (files).

It should be remembered from FIG. 1 description that in large-capicity blast furnace 10 with bell-less furnace top 11, or any other blast or shaft furnace, various kinds and categories of burden materials are periodically discharged from burden material charge source 12 atop furnace 10 to the interior of furnace 10. During discharge of materials and for some predetermined time thereafter, about one minute, burden surface 15 temperature patterns are quite unstable. Also during this time, furnace 10 interior contains dusts and gases that adversely affect infrared measurements by infrared video camera 18. Therefore, the computerized infrared data processing system 29 is programmed to inhibit the acquisition of thermal images by IDPS computer 30 during this period of instability.

In normal operation of computerized infrared data processing system 29, IDPS computer 30 is in an idle state where the only software running is that which scans the video camera, process, process sensor and operator inputs 36, 37, 38, 39, 41, 42, 43, 44, 45, 46 and 47 (Block 100). Automatic acquisition of thermal image signals is triggered after the discharge of material is complete (Block 101) and after a constant, but programmable time delay (Block 102) has elapsed. Each time the sensors described below indicate that the discharge of burden material from source 12 into furnace 10 has been completed, a software timer is started to allow sufficient time for furnace conditions and burden surface 15 temperatures to stabilize.

When the timing period has expired, a command is issued to DMA interface 49 to input one set of digital thermal image signals from video digitizer 48 (Block 103). As IDPS computer 30 acquires thermal image signals, and before they are processed and stored, they are checked for validity (Block 104). Since the temperatures of points in the thermal images carried by leads 19 and 31 are not predictable, it is nearly impossible to judge the validity of the burden surface thermal images based on the thermal image signal alone. Therefore, inputs from additional monitored furnace process parameter signals are required to determine validity of the burden surface thermal image signal.

Validating the digitized burden surface thermal image signal is done (Block 104) by checking it against one or more of the monitored furnace process parameter signals 40 or 41 to 47 input to process sensors 33 and IDPS computer 30 as follows:

A. Furnace wall reference temperature signal 40 or 41 description. As shown in FIG. 1, furnace wall reference temperature thermocouple 39 is installed opposite infrared video camera 18 but in the camera's field of view 23,24,25, for example. Thermocouple 39, or another type sensor, generates the furnace wall reference temperature signal 40 or 41 which is fed to IDPS computer 30. As thermal images are imput to IDPS computer 30, the reference temperature is compared with the temperature measured by infrared video camera 18 at a point coincident with the location of thermocouple 39. If the temperature measured by thermocouple 39 is in agreement with that of infrared video camera 18 to within some predetermined allowable error, then thermal image data may be acquired because: (1) infrared video camera 18 is obtaining a clear view across furnace 10 and (2) infrared video camera is in a satisfactory state of calibration. If these two temperatures are not in agreement after several retries, IDPS computer 30 software is designed to abort further processing and prints a corresponding error message on keyboard printer 61 indicating that valid thermal image data could not be obtained (Block 106).

B. Burden stockline status signal 42 description. As mentioned above, IDPS computer 30 acquires burden surface thermal images after a time delay has elapsed following burden material discharge from source 12 into furnace 10. Before thermal images from infrared video camera 18 are processed, IDPS computer 30 monitors burden discharge status signal 42 to insure that another material discharge is not already in progress and therefore the thermal data is valid. These discharge activities are controlled automatically by process computer 32 or manually by operator intervention. If a new material discharge has been started, either automatically or manually, IDPS computer software is designed to abort thermal image processing and print an error message on keyboard printer 61 that valid thermal image data cannot be obtained (Block 106).

C. Variable burden stockline signal 43 description. As mentioned above, stockline gauge 17 produces a variable burden stockline signal 43 proportional to the actual level of burden material 14. If burden material stockline drops to a very low level and out of infrared video camera 18 field of view, say below lower burden level 16, burden surface thermal image signals from camera 18 are not representative of actual burden surface temperatures. IDPS computer 30 software is designed to abort further processing and print an error message that valid thermal image data cannot be obtained (Block 106).

D. Charging chute status signal 44 description. Burden material charging chute 13 is constantly rotating and elevating during a charging pattern determined automatically by process computer 32 or manually by operator intervention. Thus, charging chute 13 traverses a path that is partially in view of infrared video camera 18 power equipment (not shown) when an obstruction condition occurs. IDPS computer 30 software is so designed to withhold a validity determination (Block 104) until the absence of charging chute status signal 44 is detected, thus indicating camera 18 has an unobstructed view.

E. Operating keyboard switch position signal 45 description. As mentioned above, each computer terminal keyboard, namely color CRT/keyboard display 57, CRT/keyboard cassette tape display 59, and keyboard printer 61, produce a contact closure whenever the respective keyboard is used, thus generating an operating keyboard switch position signal 45 at each terminal. IDPS computer 30 software is designed to withhold a validity determination (Block 104) until the absence of all such signals 45 are detected, thus indicating no changes in operator requests are occurring.

F. Furnace wind rate signal 46 description. During normal operation of blast furnace 10 the volume flow rate of air blast is maintained at a high wind rate level. During furnace outages or during abnormal operation, the wind rate drops to a low level. Process sensors 33 receive the furnace wind rate signal 46, which may be initiated at process control computer 32 or another source, and inputs this signal to IDPS computer 30 to indicate the high or low status of wind rate. IDPS computer 30 software is so designed that a high wind rate signal will validate (Block 104) the thermal image signal processing. If a low wind rate signal is detected, the thermal image signal processing will be aborted and keyboard printer 61 will print a corresponding error message (Block 106).

G. Furnace top water spray signal 47 description. Some contemporary blast furnaces 10 are equipped with furnace top water sprays (not shown). The water sprays interfere with infrared video camera 18 view of burden material 14, whether at upper or lower levels 15,16 and cause the generation of steam. Transmission of infrared energy through steam is very poor and accurate burden surface temperature measurements cannot be made. Process sensors 33 receive a furnace top water spray status signal 47, which may be initiated by process control computer 32 or another source, and inputs this signal to IDPS computer 30 to indicate the presence or absence of water spray and therefore steam. IDPS software is so designed that an absence of water spray will validate (Block 104) thermal image signal processing. If the water spray signal is detected, the thermal image signal processing will be aborted and keyboard printer 61 will print a corresponding error message (Block 106).

Because uncertainties in data acquisition may exist in some blast furnace installations while making the validity error checks on monitored furnace process parameter signals, software subroutines for IDPS computer 30 may be modified to make two more attempts at processing a valid burden surface thermal image signal to overcome any uncertainties. Thus, if after three attempts (Block 105 and Block 105') a valid thermal image signal cannot be obtained, a corresponding error message for each basis of invalidation will be printed on keyboard printer 61 (Block 106) with greater certainty.

In certain blast furnace installations it may or may not be desirable from the furnace operator's point of view to monitor all of the foregoing furnace process parameters. Any one or more of these parameters may be eliminated or alternate parameters substituted in making the validity error check simply by not incorporating their subroutine or subroutines in the software for IDPS computer 30 and substituting their alternates if desired.

When a valid thermal image signal is obtained based on the error checks described above, the valid thermal image signal is classified (Block 107). The signals are classified based on: (1) current burden material type, (2) preceding burden material type and (3) burden distribution pattern based on the charging chute rotating and elevating patterns. Burden surface thermal image classification is necessary because these three parameters have a significant effect on furnace operation and in turn on the specific image characteristic at any point in time.

As each processed burden surface thermal image is acquired, the burden discharge sequence signal 36, burden material type signal 37 and rotating and elevating charging chute pattern signal 38 are obtained from process control computer 32. IDPS computer 30 has in disc memory 54 an operator programmable table of thermal image classifiers according to burden categories. The table includes the material types and charging chute patterns used in normal furnace operation.

As each thermal image is acquired and the classifiers defined, IDPS computer 30 searches the classifier table for a match. If a match is found, the thermal image is assigned a corresponding category number and is then stored in an appropriate category file. This storage is described below. If no match is found, an error message is printed by keyboard printer 61. This indicates that the operation of furnace 10 has changed and the operator should make a new entry in the table of classifiers to reflect the change.

Even when a match cannot be found, thereby indicating the thermal image cannot be classified, the thermal image may be a perfectly valid one. Rather than discard these unclassifiable thermal images they are stored in a special "undefined category" file.

Correction of the validated, digitized, burden surface thermal image signal will now be described with respect to infrared video camera 18 infrared detector nonlinearities and geometric distortion due to camera obliqueness. Alternately, corrections may be made for infrared video camera 18 calibration, if desired.

Infrared video camera 18 has an infrared detector, whether of the AGA "Thermovision" system or other commercial devices, which produces a nonlinear raw analog signal on lead 19, and therefore the output of video detector 48 is nonlinear. As is well known, this nonlinearity approximates the fourth power and therefore a simple conversion algorithm cannot be used to determine burden surface temperature. The conversion algorithm involves multiplying the original voltage-temperature function by the inverse function of voltage-temperature. $\rightarrow V = f(T) \rightarrow Kf^{-1}(T) \rightarrow$ conversion algorithm. Software for IDPS computer 30 is designed to use the actual nonlinear characteristic function of the particular infrared detector used in video camera 18. This inverse function is precalculated and stored in a digital "look-up" table in disc memory 54. The digital thermal image signal output from video digitizer 48 is used as an index into the "look-up" table to retrieve the correct digital value of the linear burden surface temperature to be converted to a signal for further thermal image processing. In this manner, the raw nonlinear analog infrared video signal from the detector in camera 18 is converted to a true digital surface burden temperature signal, point-by-point over the surface area scanned, to compensate for camera 18 detector nonlinearity in detecting thermal energy (Block 108).

Discovery has been made that the actual nonlinear characteristic varies from infrared camera detector-to-detector, regardless of its commercial source. This variation generally has an adverse effect on accuracy of thermal image measurements. It is for these reasons, the linearity correction of infrared video camera 18 detector signal have been tabularized. In the event a detector must be replaced, the replacement detector element will likely have a different nonlinear characteristic. Thus, the software for IDPS computer 30 may be modified by rebuilding the correction table to accommodate almost any new infrared detector characteristic.

Infrared video camera 18, because of its offset mounting in furnace top 11, views the burden surfaces at a fixed oblique angle. This causes a geometric distortion of burden surface at and between upper and lower stocklines 15,16. In other words, both the raw analog infrared video camera signal on lead 19, as well as the linearized digital thermal image signal, are not a "top down" view of burden surface at upper level 15 or at other stocklines down to lower level 16.

Software for IDPS computer 30 is designed to correct the averaged, linearized, digital thermal image signals for camera geometric distortion to make them appear as though burden surface 15 is being viewed directly down from the top center of furnace 10. This is done by using the known fixed oblique camera view angle 23,24,25, with respect to the burden surface 15,16, for example, and burden stockline signal 43 as variables to map the coordinates seen by infrared video camera 18 into physical furnace coordinates (Block 109).

Figure 8:
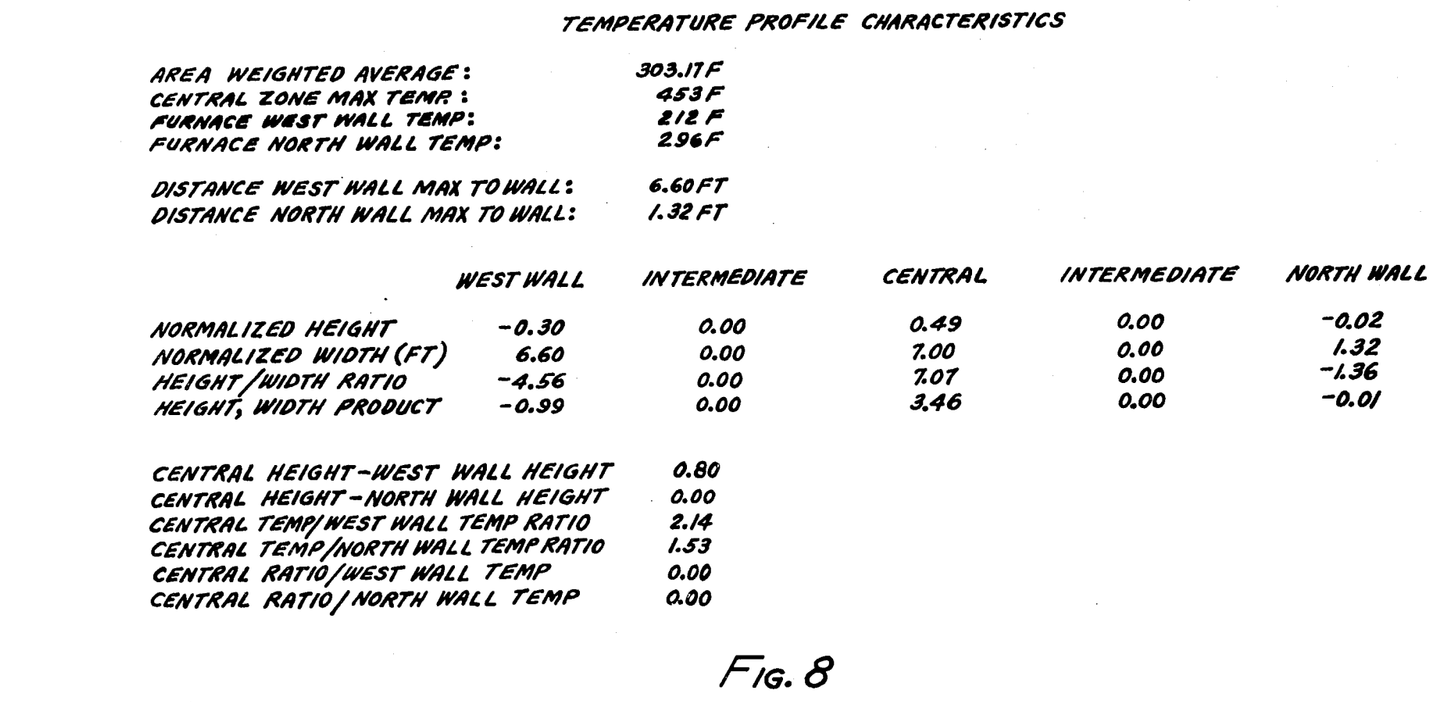
FIG. 8 is a typical tabular showing similar to FIG. 6 but of data representing the FIG. 7 burden charge.
Figure 9:
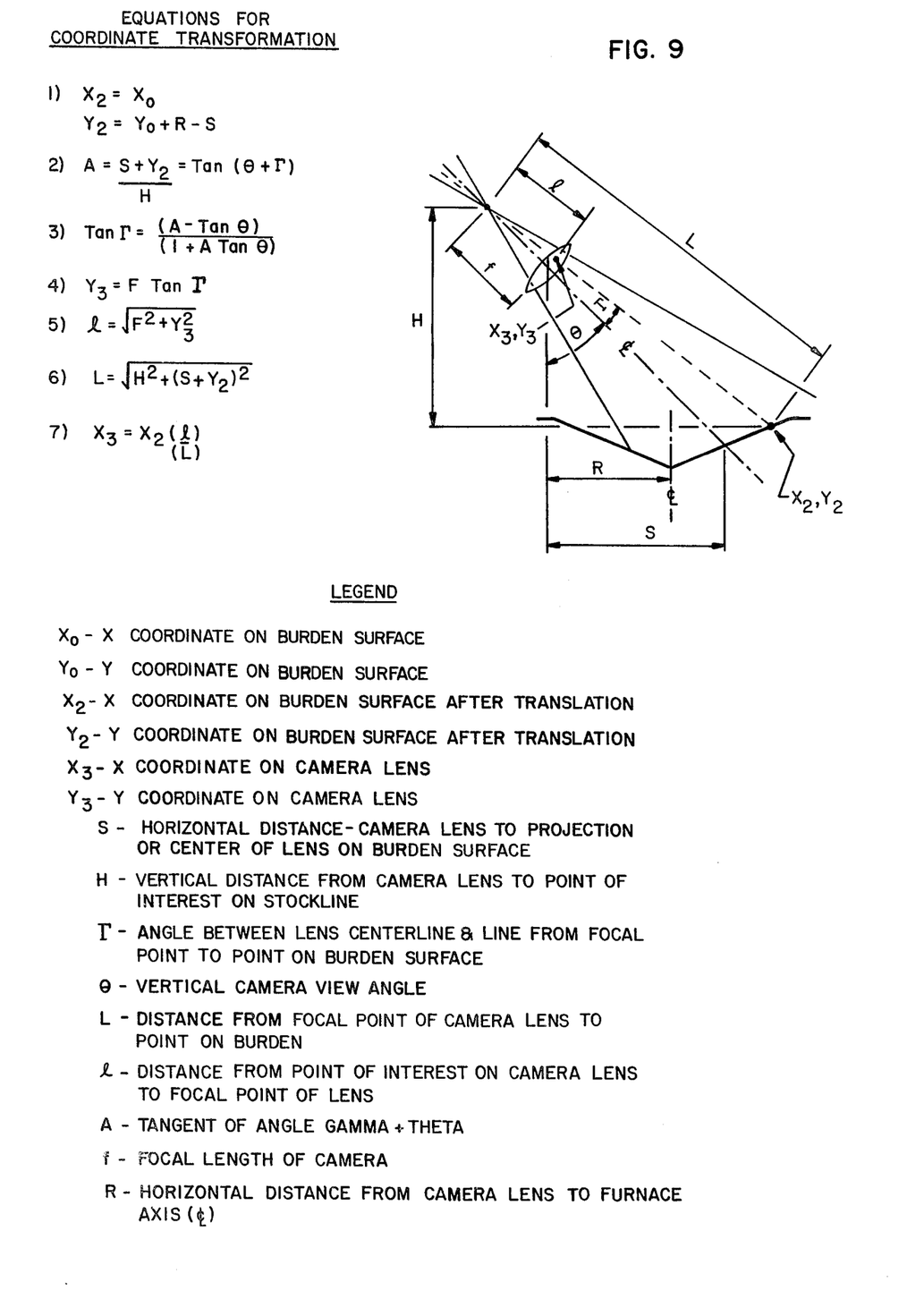
FIG. 9 is a schematic elevational view of the camera position in relation to one particular furnace burden stockline and equations used for transforming coordinates seen by the camera into physical furnace coordinates.

Shown in FIG. 9, are the geometric relationships among the camera, burden stockline and angular relationships with respect to the center lines of the camera and furnace. Equations 1 through 7 are utilized to translate camera coordinates to furnace coordinates, as will be recognized by one skilled in the art. Coordinate transfer look-up tables are predetermined and stored in disc memory 54 for the seven most frequently used burden stocklines at and between burden surface levels 15 to 16. There may be fewer or greater stockline entries in any look-up table, depending upon operator preference. Regardless, each scanned point in the averaged, linearized, digital thermal image signal is thus shifted to its correspondingly correct location with respect to the furnace image coordinate notation shown in FIGS. 1 and 3-8.

Since points in the camera coordinate array may at times not exactly match the points in the furnace coordinate array, the software for IDPS computer 30 is designed to perform an interpolation of neighboring points in the furnace coordinate array. In so doing the coordinate transfer tables in disc memory 54 will be properly structured to correct the linearized digital thermal image signal with respect to furnace image coordinate rotation referred to above.

Similarly, provisions are made in the software for IDPS computer 30, to run on demand, to modify the coordinate transfer tables stored in disc memory 54 for (1) different infrared video camera 18 view angles 23,24,25 and burden stocklines 15,16 and (2) movable camera with movable coordinates around fixed furnace coordinates.

Where furnace installations are such that furnace top 11 may be structured such that a "top-down" thermal image is attainable without introducing into the video camera an offset oblique to the burden surface; then the step of correcting the linearized digital thermal image signal to compensate for obliqueness may be omitted. However, it is still desirable to correct for changes in apparent optical resolutions on the burden surface caused by change in camera-to-burden distance, and to validate and correct the nonlinearities in the digital thermal image signal.

The process of acquiring, categorizing, linearizing, transforming coordinates, and camera calibrating if used, the thermal image signal is repeated a number of times, for example, four times (Block 110). The multiple image signals are averaged to improve the signal to noise ratio (Block 111).

Following camera and furnace point-by-point averaging and coordinate transformation in the look-up tables, the corrected thermal image signal is stored on disc memory 54 where it is arranged to be accessed on demand for current batch image display, or, as described below, used in computing hourly, 8-hour or daily averages.

After classifying each burden surface thermal image, they are stored in disc memory 54 files as follows:
(1) They are placed in a disc file for quick access for CRT display (Block 112),
(2) they are placed in a file containing the most recent sixteen (16) burden surface thermal images of any classification (Block 113),
(3) They are placed in a files based on their classification (Block 114), and
(4) they are placed in a file containing images from the most current furnace charging cycle, which normally consists of four (4) or more consecutive and unique material discharges from source 12 in a predetermined order (Block 115).

Referring now to FIG. 2-A, logic path referred to generally at column H is followed automatically in response to clock time request (Block 117).

Data is retrieved (Block 118) from disc file storage performed in Blocks 113, 114 and 115 and such data are periodically averaged and additional files are created in disc memory 54 as follows (Block 119):
(5) each hour the burden surface thermal images are averaged based on individual classification and these hourly averages are stored for forty-eight (48) hours,
(6) each hour the average of thermal images from all categories is computed and stored for 8 hours,
(7) each hour the composite 8 hour running average is computed, and
(8) at the end of each day the composite daily average is computed and stored for 30 days.

In order to reduce mass data storage requirements and to simplify interpretation of the burden surface thermal image at various stocklines, software for IDPS computer 30 is designed to automatically extract and store only certain key features of the thermal image data (Block 120). The most important of these features is burden surface thermal profile at each of the predetermined number of burden stocklines. To generate the thermal profile, temperature data are obtained from the corrected thermal image data along two preselected lines forming angular segments on each burden surface scanned and are plotted against furnace position. Thermal profiles provide a qualitative indication of gas-flow inside the furnace, an important operating parameter.

The two thermal profile positions on the preselected angular line segments are fixded. As shown in FIGS. 1 and 3-8, those thermal profile line segments extend from furnace west wall (FW) to the furnace center (C), and from furnace center (C) to the furnace north wall (FN). These locations were selected from a particular installation because infrared video camera 18 usually has a clear view along thermal profile line segments FW-C-FN when charging chute 13 is not in the field of view of camera 18. Thermal profiles are plotted and stored for twenty-five (25) temperature points on each burden surface at every predetermined stockline. Each hour, thermal profiles are extracted from the thermal image hourly averages (Block 119) and these profiles are stored for 30 days (Block 121). Also, at the end of each day, the daily average of the thermal profile for each individual classification is computed and stored for 30 days (Block 121). Also detected and labelled with the quantified data are burden surface maximum temperature and its location relative furnace center C, in addition to date, time, material category and material stockline.

Figure 5:
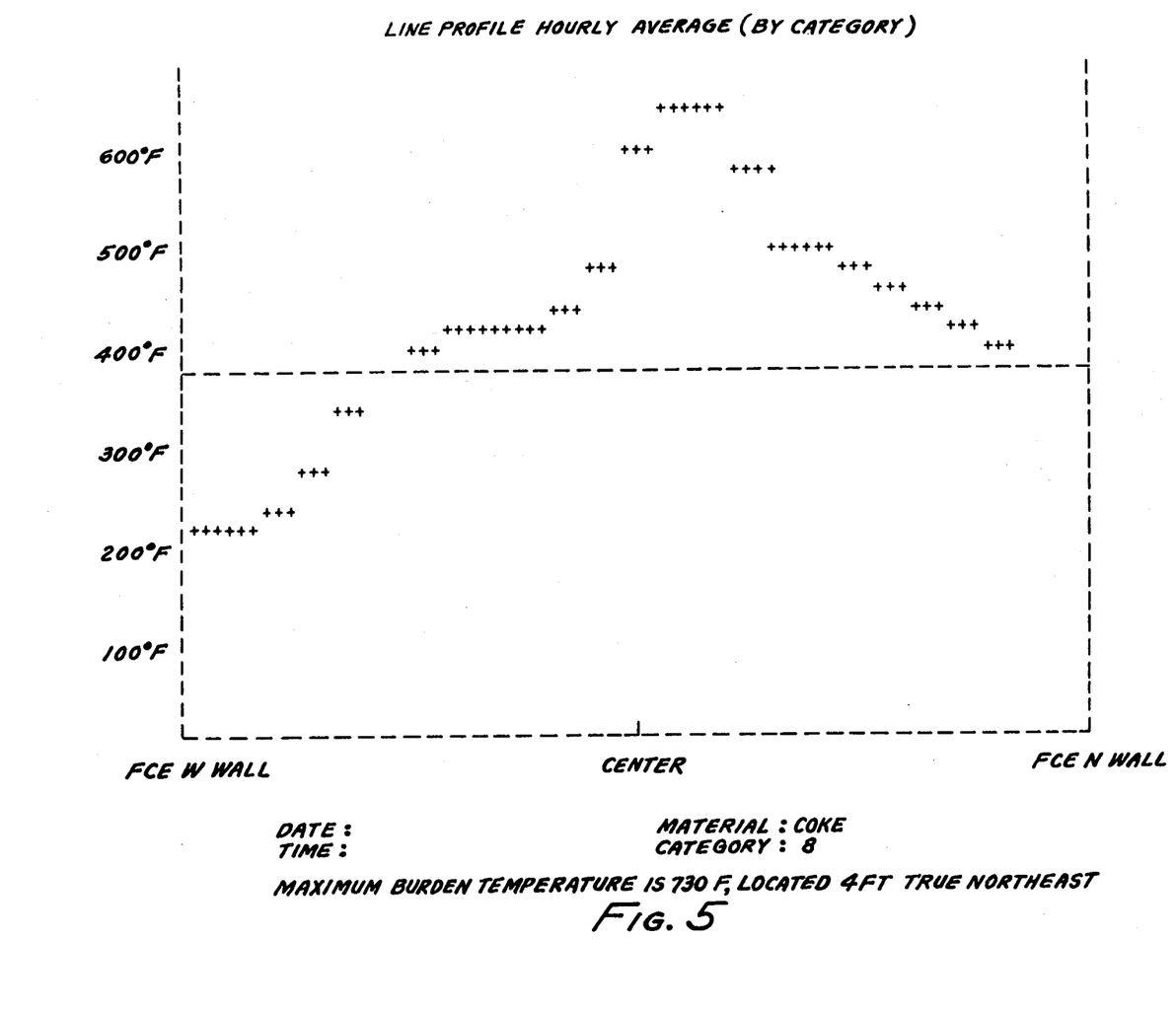
FIG. 5 is a typical graphical showing on a CRT, or printing terminal of a line temperature profile of an houly average corrected temperature of a first burden material and second category thereof taken along the same vertical cross-sectional plane as in FIG. 4.
Figure 6:
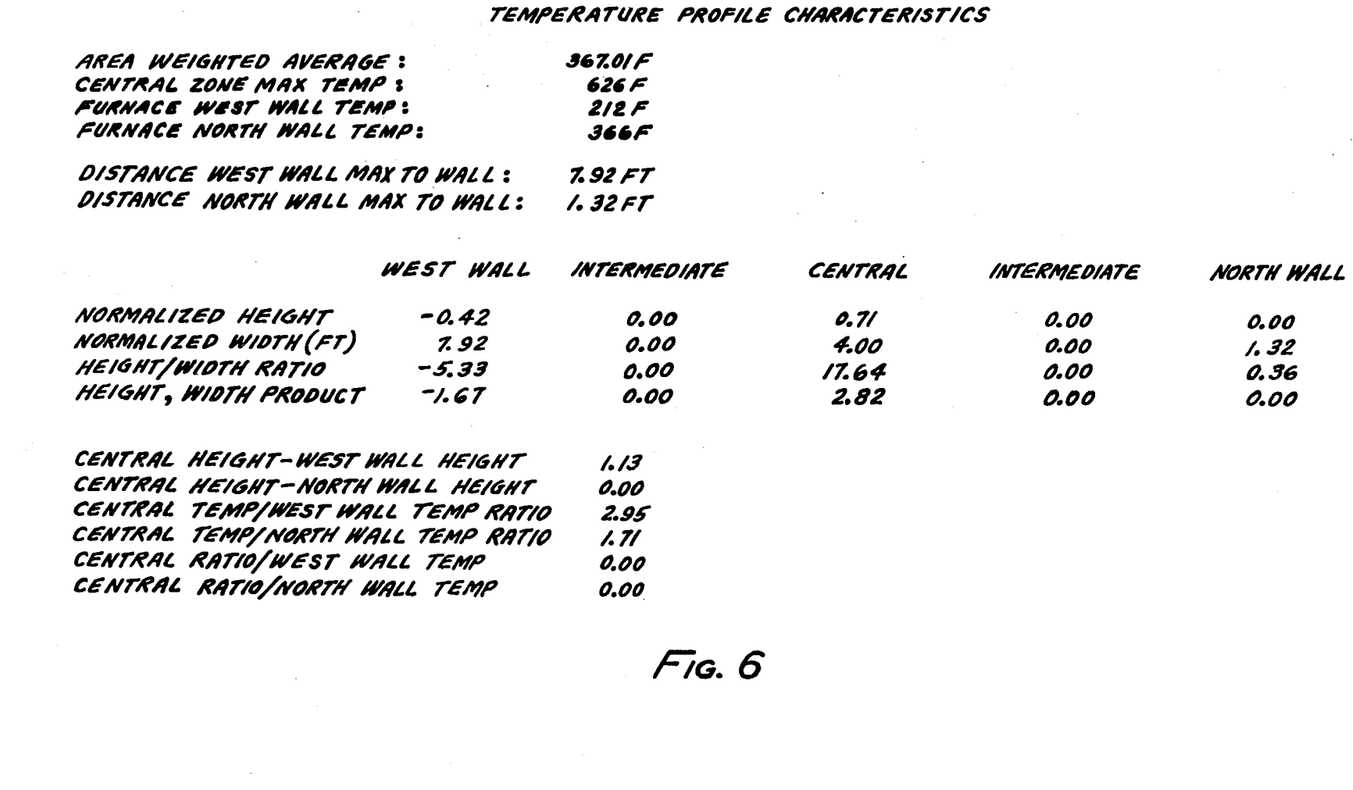
FIG. 6 is a typical tabular showing on a printing, or CRT, terminal of a corrected temperature profile and distribution characteristic data used in the FIG. 5 burden charge and cross-sectional plane.
Figure 7:
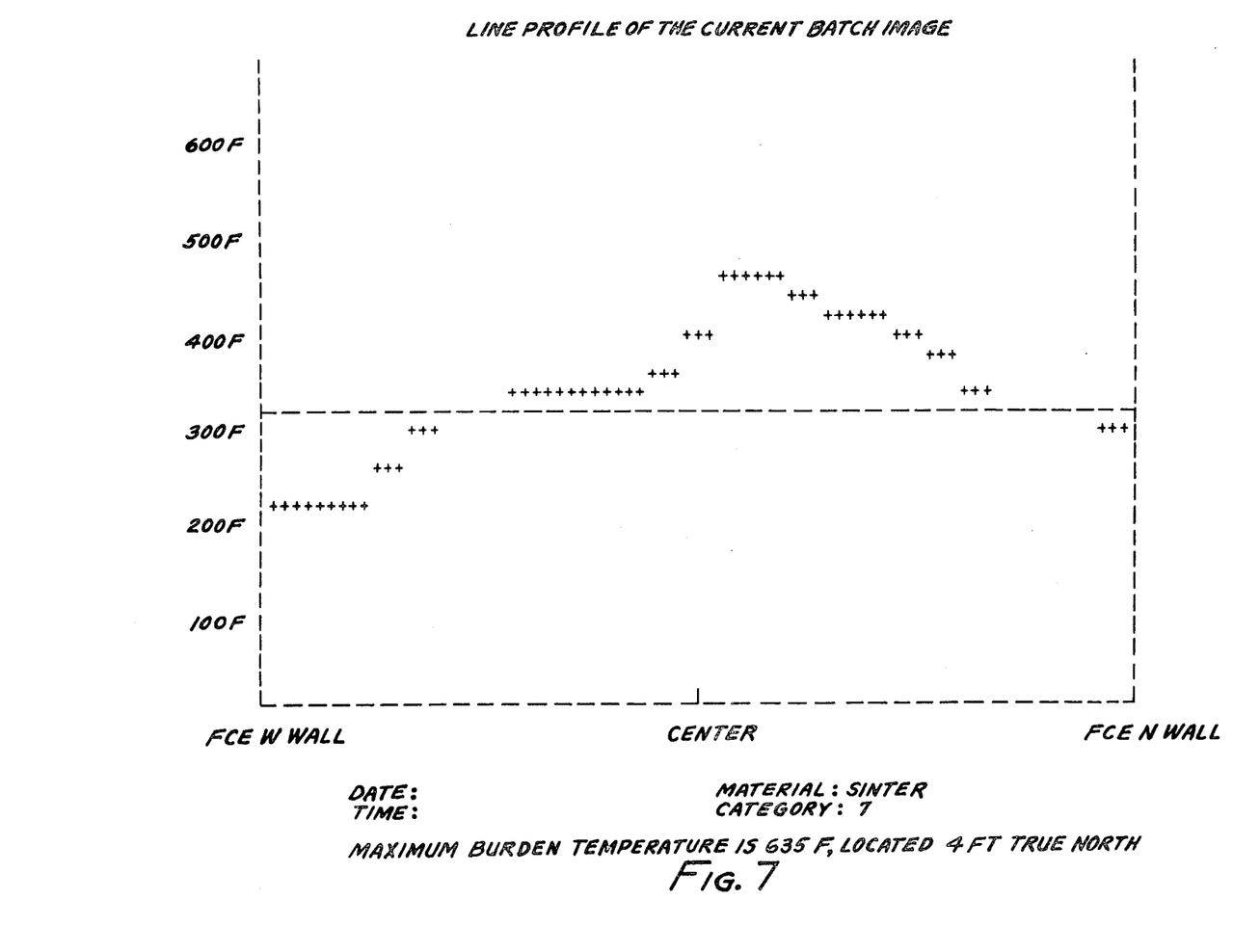
FIG. 7 is a typical graphical showing similar to FIG. 5 but of a current batch image of second burden material and third category thereof.

The stored thermal profile and labelled data are accessed and displayed graphically on color CRT/keyboard display 57,59 and/or printed as hard copy of keyboard printer 61. Thermal images and their characteristics are automatically printed by keyboard printer 61 on the hour, every eight (8) hours, and at the end of each day (Block 122). FIG. 4 shows a typical display of graphical thermal line profile plot of a current batch image of burden material as labelled. FIGS. 5 and 7 show typical printouts of graphical thermal line profile plots of hourly average, by category, and current batch image of a different category of burden material then used in FIG. 4. FIGS. 6 and 8 show typical tabular printouts of actual temperature profile characteristics used to plot the printouts of FIGS. 5 and 7.

FIGS. 3 and 4–8 are merely illustrative of the vast amount of thermal image and thermal profile data available by the present invention to a furnace operator in providing a qualitative indication of gas-flow in the furnace under nearly endless combinations of operating conditions. Burden surface thermal images represented as thermal profiles are retained in disc memory 54 with considerably less storage requirements than is required to retain their entire original image, thus enabling sixty-two (62) days of thermal profiles to be associated with the vast number of combinations of operating conditions.

The acquisition, processing, display and storage of burden surface thermal images and thermal profiles as described above (Blocks 100–122) will occur automatically. Normally, no operator intervention is required. However, the operator at his option can use the keyboard, for example, color CRT/keyboard display 57 (Block 123) to: (1) request thermal data from infrared video camera 18, (2) extract and display temperature profiles when complete burden surface thermal images are displayed, (3) retrieve and display thermal data stored for example on disc memory 54, or (4) request hard copy printouts of data displayed on the color CRT terminal 57.

For thermal data from infrared video camera 18, the operator enters the acquire image request (Block 124). Thereafter, the camera signal is digitized (Block 125), classified (Block 126), linearized (Block 127), transformed (Block 128) and displayed (Block 129) as previously described for Blocks 103, 107, 108, 109, and 116 respectively.

For line profile requests, the operator enters the line profile request (Block 130). Thereafter, temperature profiles are extracted (Block 131) as previously described for Block 120, and displayed (Block 132).

To retrieve and display stored thermal data, the operator enters data retrieval request (Block 133) which initiates an interactive data retrieval subroutine. Each file containing data is listed on the CRT display and the operator is asked to enter the file type, date and time, and image classification, if appropriate, of the data requested (Block 134). If the request is valid, (Block 135), IDPS computer 30 locates the appropriate data file (Block 136), reads the data from the disc file (Block 137) and causes the data requested to be shown on CRT/keyboard display 57 (Block 138). If the request is not valid (Block 135) the operator is requested by the computer to re-enter the category and data information (Block 134) and the logic will then be carried out as described above. The furnace operator can then obtain hard copy printouts on keyboard printer 61, if desired.

While the thermal image and thermal profile data retrieval operation is in progress, the operator has only control of the color CRT/keyboard display 57, but cannot interrupt data processing by IDPS computer 30. Thermal images and thermal profiles of the burden surface will continue to be acquired and stored by IDPS computer 30, but these data will not be displayed.

Thermal image and thermal profile data files reside on disc memory 54, and data is stored for time periods as indicated above in connection with classifying and/or storing such data. If it is desired to save such data for longer periods, it can be transformed on demand to cassette magnetic tapes in the programming terminal identified as CRT/keyboard cassette tape 59. This is accomplished by using interactive subroutines at the programming terminal 59.

Finally, the operator can request a hard copy of any CRT image (Block 116, 129, 132, 138) by entering print data request (Block 139) and a hard copy will be provided (Block 140).

We claim:

1. Method of determining a furnace burden surface thermograph, which comprises:
   (a) producing a burden surface thermal image signal from a video camera viewing obliquely the burden surface and covering various stocklines;
   (b) generating a variable burden stockline signal;
   (c) validating the burden surface thermal image signal in response to at least one monitored process parameter signal associated with the furnace;
   (d) correcting electronically the validated burden surface thermal image signal for at least one video camera error;
   (e) extracting at least one key feature of the corrected burden surface thermal image signal at various values of burden stockline signals to represent a cross-sectional segment of the furnace burden; and
   (f) utilizing the corrected extracted feature of the thermal image signal in the reconstruction of an intelligible representation of the burden surface cross-sectional temperature property.

2. Apparatus for determining a furnace burden surface thermograph, which comprises:
   (a) means for producing a burden surface thermal image signal from a video camera viewing the burden surface;
   (b) data processing means including means for validating the burden surface thermal image signal in response to at least one monitored process parameter signal associated with the furnace;
   (c) means for utilizing the validated thermal image signal to cause the production of an intelligible representation of the burden surface temperature.

3. Apparatus of claim 2 wherein the validating means responds to a monitored process parameter signal representing furnace wall reference temperature from a sensor in view of the video camera, furnace wind rate, burden material charge, category and discharge status, charging pattern and charging chute position, a variable burden stockline, and furnace top water spray, and the validating means responds to said one or more parameter signals.

4. Apparatus for determining a furnace burden surface thermograph, which comprises:
   (a) means for producing a burden surface thermal image signal from a video camera viewing obliquely the burden surface and covering various stocklines;
   (b) data processing means including means for correcting electronically the burden surface thermal image signal for at least one video camera error; and
   (c) means for utilizing the corrected thermal image signal to cause the production of an intelligible representation of the burden surface temperature.

5. Apparatus of claim 4 wherein the correcting means overcomes a camera error characterized as geometric distortion due to camera obliqueness at various burden stocklines, raw video camera signal nonlinearity, and camera calibration, and further including means for generating a variable burden stockline signal as required for distortion correction purpose.

6. Apparatus for determining a furnace burden surface thermograph, which comprises:
(a) means for producing a burden surface thermal image signal from a video camera viewing obliquely the burden surface and covering various stocklines;
(b) data processing means including means for validating the burden surface thermal image signal in response to at least one monitored process parameter signal associated with the furnace;
(c) means included in the data processing means for correcting electronically the validated burden surface thermal image signal for at least one video camera error; and
(d) means for utilizing the validated and corrected thermal image signal to cause the production of an intelligible representation of the burden surface temperature.

7. Apparatus for determining a furnace burden surface thermograph, which comprises:
(a) means for producing a burden surface thermal image signal from a video camera viewing the burden surface and covering various stocklines;
(b) means for generating a variable burden stockline signal;
(c) data processing means including means for extracting at least one key feature of the burden surface thermal image signal at various values of burden stockline signals to represent a cross-sectional segment of the furnace burden surface; and
(d) means for utilizing the extracted feature of the thermal image signal in the reconstruction of an intelligible representation of the burden surface cross-sectional temperature property.

8. Apparatus of claim 7 wherein the extracting means feature includes burden thermal profile and burden profile characteristics.

9. Apparatus for determining a furnace burden surface thermograph, which comprises:
(a) means for producing a burden surface thermal image signal from a video camera viewing obliquely the burden surface and covering various stocklines:
(b) means for generating a variable burden stockline signal;
(c) data processing means including means for validating the burden surface thermal image signal in response to at least one monitored process parameter signal associated with the furnace;
(d) means included in the data processing means for correcting electronically the validated burden surface thermal image signal for at least one video camera error;
(e) means included in the data processing means for extracting at least one key feature of the corrected burden surface thermal image signal at various values of burden stockline signals to represent a cross-sectional segment of the furnace burden surface; and
(f) means for utilizing the corrected extracted feature of the thermal image isgnal in the reconstruction of an intelligible representation of the burden surface cross-sectional temperature property.

10. Apparatus for determining a furnace burden surface thermograph, which comprises:
(a) means for producing a burden surface thermal image signal from a video camera viewing obliquely the burden surface and covering various stocklines;
(b) means for generating a variable burden stockline signal;
(c) data processing means including means for processing the thermal image signal and at least the stockline signal as required for validating and, if required, correcting purposes;
(d) means included in the data processing means for classifying the processed thermal image signal according to burden charging material and pattern characteristic signals;
(e) means included in the data processing means for storing the classified processed thermal image signal; and
(f) means for utilizing the stored thermal image signal to cause the production of an intelligible representation of the burden surface temperature and burden classification.

11. Apparatus of claim 10 wherein the classifying means classifies according to current burden material type signal, preceding burden material type signal and burden distribution pattern based on a charging chute position signal.

12. Apparatus of claim 10 where in the storing means the classified image data are placed in one or more storage files containing a predetermined number of the most recent images of any classifiecation, their classification, and images from current furnace charging cycle having a predetermined number and order of burden discharges.

13. Apparatus of claim 12 wherein the storage means files are periodically averaged and additional files are created of periodic data.

14. Apparatus of claim 12 wherein the means for classifying or means for storing is done by accessing from a thermal image display terminal.

15. Apparatus for determining a furnace burden surface thermograph, which comprises:
(a) means for producing a burden surface thermal image signal from a video camera viewing obliquely the burden surface and covering various stocklines;
(b) means for generating a variable burden stockline signal;
(c) data processing means including means for validating the burden surface thermal image signal in response to at least one monitored process parameter signal associated with the furnace;
(d) means included in the data processing means for correcting electronically the validated burden surface thermal image signal for at least one video camera error;
(e) means included in the data processing means for extracting at least one key feature of the corrected burden surface thermal image signal at various values of burden stockline signals to represent a cross-sectional segment of the furnace burden surface;
(f) means included in the data processing means for classifying the extracted thermal image signal according to burden charging material and pattern characteristic signals;

(g) means included in the data processing means for storing the classified thermal image signal; and (h) means for utilizing the stored thermal image signal to cause the production of an intelligible representation of the burden surface temperature and burden classification.

16. Apparatus of claim 15 wherein the means for utilizing the processed thermal image signals includes means for displaying a processed thermal image or a thermal profile on a display terminal and, if desired, means for printing the thermal image or a thermal profile on a printing terminal.

* * * * *